United States Patent [19]

Hatanaka et al.

[11] Patent Number: 5,693,286
[45] Date of Patent: Dec. 2, 1997

[54] CART MOUNTING A WELDING TORCH OR CUTTING TORCH

[75] Inventors: Isamu Hatanaka, Kamagaya; Yuriaki Kaneko, Sakura; Kenichi Nezu, Tokyo, all of Japan

[73] Assignee: Koike Sanso Kogyo Co., Ltd., Tokyo, Japan

[21] Appl. No.: 698,007

[22] Filed: Aug. 13, 1996

[30] Foreign Application Priority Data

Aug. 17, 1995 [JP] Japan .................... 7-209637

[51] Int. Cl.$^6$ ............................................ B23K 7/10
[52] U.S. Cl. ............................................. 266/67; 266/48
[58] Field of Search ................. 266/48, 66, 67, 266/73

[56] References Cited

U.S. PATENT DOCUMENTS

| | | | |
|---|---|---|---|
| 2,475,891 | 7/1949 | Harris | 266/67 |
| 3,764,777 | 10/1973 | Sakabe et al. | 219/125 R |
| 4,127,258 | 11/1978 | Brovman et al. | 266/73 |
| 4,327,898 | 5/1982 | Grant et al. | 266/67 |
| 4,378,934 | 4/1983 | Tucker | 266/67 |

OTHER PUBLICATIONS

Patent Abstracts of Japan, vol. 18, No. 538, (M-1686) Oct. 13, 1994.

*Primary Examiner*—Scott Kastler
*Attorney, Agent, or Firm*—Townsend & Banta

[57] ABSTRACT

A cart traveling on a track material in mounting a welding torch or cutting torch includes two drive apparatuses to transmit the drive power independently to left and right wheels. The cart can incorporate a magnet inside the cart body so as to be movable in a direction that the magnet comes close to and away from the track material. The cart may be formed with a sensor which allows the cart to cruse automatically.

8 Claims, 4 Drawing Sheets

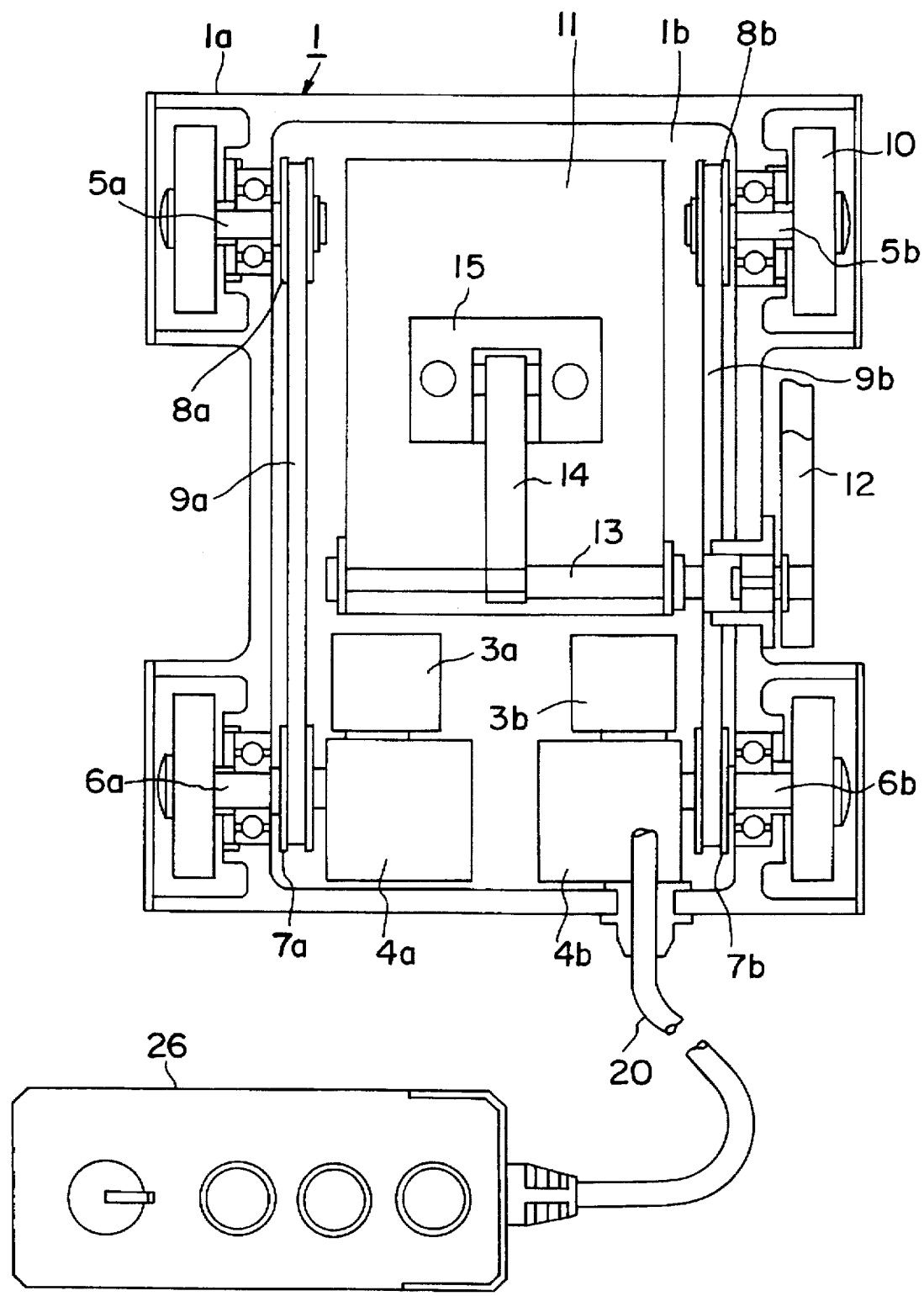
F I G. 2

CART MOUNTING A WELDING TORCH OR CUTTING TORCH

BACKGROUND OF THE INVENTION

1. Field of the Invention

This invention relates to a movable cart mounting a welding torch or cutting torch and, more particularly, to a railless cart for which no rail or guide is required to perform welding or cutting with respect to works on walls.

2. Description of Related Art

Carts mounting a welding torch or cutting torch can be classified, with respect to methods to control their own traveling direction, into two categories: rail carts traveling along a rail and railless carts self-propelled without using any rail. Such carts generally mount inside them a motor serving as a drive apparatus to perform a two or four wheel drive.

The rail carts perform work while traveling along a rail where the rail has been constructed along an assembly line prior to actually welding or cutting. The cart can therefore operate to weld or cut in trailing curving and straight routes. The rail carts of this type are presently used to cut or weld workpieces located on walls or on steep slopes and formed with a derailing prevention device to prevent the cart from derailing.

The railless carts are disclosed in, e.g., Japanese Patent Publication, Showa No. 62-54,587, Japanese Patent Publication, Showa No. 62-54,588, Japanese Patent Publication, Showa No. 62-54,589, Japanese Patent Publication, Heisei No. 3-80,588, Japanese Patent Publication, Heisei No. 3-80,589, and Japanese Patent Publication, Heisei No. 3-80,590. Those carts are mainly for fillet-welding and have the feature that a welding actuator thereof or head can change its direction at corners of workpieces. However, since the carts themselves do not include a device to modify or control the direction of travel during their straight movement, the of travel direction of travel must be regulated by an external force. Such railless carts have used side face guiding systems in which side faces of the workpieces are used as a traveling reference to regulate the traveling direction. A typical side face guiding system is concisely described below.

Arms are extended from the side of a cart toward a guide and; a roller or rollers arranged at the tip of the arm come into contact with the guide. The cart is constructed so as to drive straight as well as to maintain the condition that the moving direction of the cart is slightly inclined toward the guide. More specifically, for example, a pair of arms is formed at front and rear portions of the cart, and the front arm is shorter than the rear arm. When the cart begins to move, the cart can move in a direction parallel to the guide, but it cannot move in a direction perpendicular to the guide, even when close thereto, due to an opposing force from the guide through the arms, thereby rendering itself slide on the track material. The cart consequently travels parallel to and along the guide. According to this side face guide system, the cart can weld or cut along straight and slightly curving lines.

Such a cart needs to have adequate pulling force during movements to pull various hoses and electric cords corresponding to the types of work to be performed, therefore the cart needs to increase the friction between the wheels of the cart and the track material, as well as to mount a powerful propelling drive apparatus. On the other hand, generally welding or cutting works in use on such a cart are frequently subject to changes of working places, so that it is desirable to make the cart lighter to reduce labor for conveyances and installations. However, those demands basically contradict each other.

To solve such a problem, a cart has been proposed in which a magnet is formed at wheels or inside the body thereof. In this cart, the magnet attracts the track material to increase vertical attracting force, thereby preventing the wheels from skidding or slipping by increasing the friction between the wheels of the cart and the track material without increasing the mass of the cart. The cart whose wheels are made of a magnet, however, has the wheels merely in point contact with the track material. It is also general that the surfaces of the wheels are knurled to prevent the surfaces from slipping. As a result, the magnet serves only for weak attracting force and is hardly effective. Although the cart constructed with a magnet inside the cart body may be able to have strong pulling force, further strong force may be needed to pull the cart away from the track material when the cart is conveyed, thereby increasing the task of workers, and thereby raising a problem that the bottom of the cart attracts steel powder or pieces that have to be cleaned up at every use.

With the rail cart, rails have to be brought and constructed on track material, so that this work would be laborious. Construction of rails may be difficult in a limited working area or on rugged track materials, and the shape of the workplace may restrict application range of the rail cart. Though the rail cart is generally used to work on workpieces located on walls or steep slopes, construction of rails on walls or slopes needs further labor force. Moreover, the rail cart itself becomes heavier due to the derailing prevention device, so that it is not easy to carry such a rail cart.

The railless cart, though propelled by itself, does not have a function to control its direction, and therefore, a guide as a reference for running is inevitable to regulate the traveling direction. If such materials arranged along the work lines do not exist, a guide must be newly provided along the line for welding work. The guide must be so secured against propelling force in the guide direction of the cart. The railless cart formed with a magnet inside the body needs a guide to travel when traveling on walls or steep slopes in a similar way when the cart runs on a flat ground. The construction of guides on a structure, such as walls or steep slopes, also needs time and labor as well as the construction of rails.

With the cart having its magnet inside the body, a large amount of force is required to pull the cart away from the track material. To solve such a problem, we have developed a cart inside the body of which a magnet is mounted as to be movable in a direction to come close to and away from the track material, as disclosed in Japanese Patent Application Heisei, No. 6-71,875, and No. 6-232,672. This cart is made lighter, has stronger pulling force, and allows itself to be easily detached from the track material by reducing the attracting force while conveyed.

SUMMARY OF THE INVENTION

It is an object of the invention to provide a railless cart, being capable of traveling over structures such as walls and steep slopes by incorporating a magnet inside the cart body thereof and reducing the attracting force while conveyed, and having a controller of the traveling direction in the cart itself so it can travel without any guide or rail.

The present invention is characterized in a cart mounting a welding torch or cutting torch, traveling on track materials, and having two drive apparatuses, which independently transmit their drive power respectively to left wheels and right wheels. In a preferred embodiment, the cart body is driven by four wheels, in which a front wheel and a rear wheel are connected to one another on each side to transmit the drive power. The cart may incorporate inside thereof a magnet movable in a direction to come closer to and away from a track material. With the cart, a sensor detects a traveling reference, and in accordance with the signals from the sensor, the output of the two drive apparatuses is controlled to control the traveling direction of the cart.

BRIEF DESCRIPTION OF THE DRAWINGS

The above and other objects and features of the invention are apparent to those skilled in the art from the following preferred embodiments thereof when considered in conjunction with the accompanied drawings, in which:

FIG. 2 is a cross-sectional top view showing inside of the cart of FIG. 1;

DESCRIPTION OF THE PREFERRED EMBODIMENTS

Figure 1:
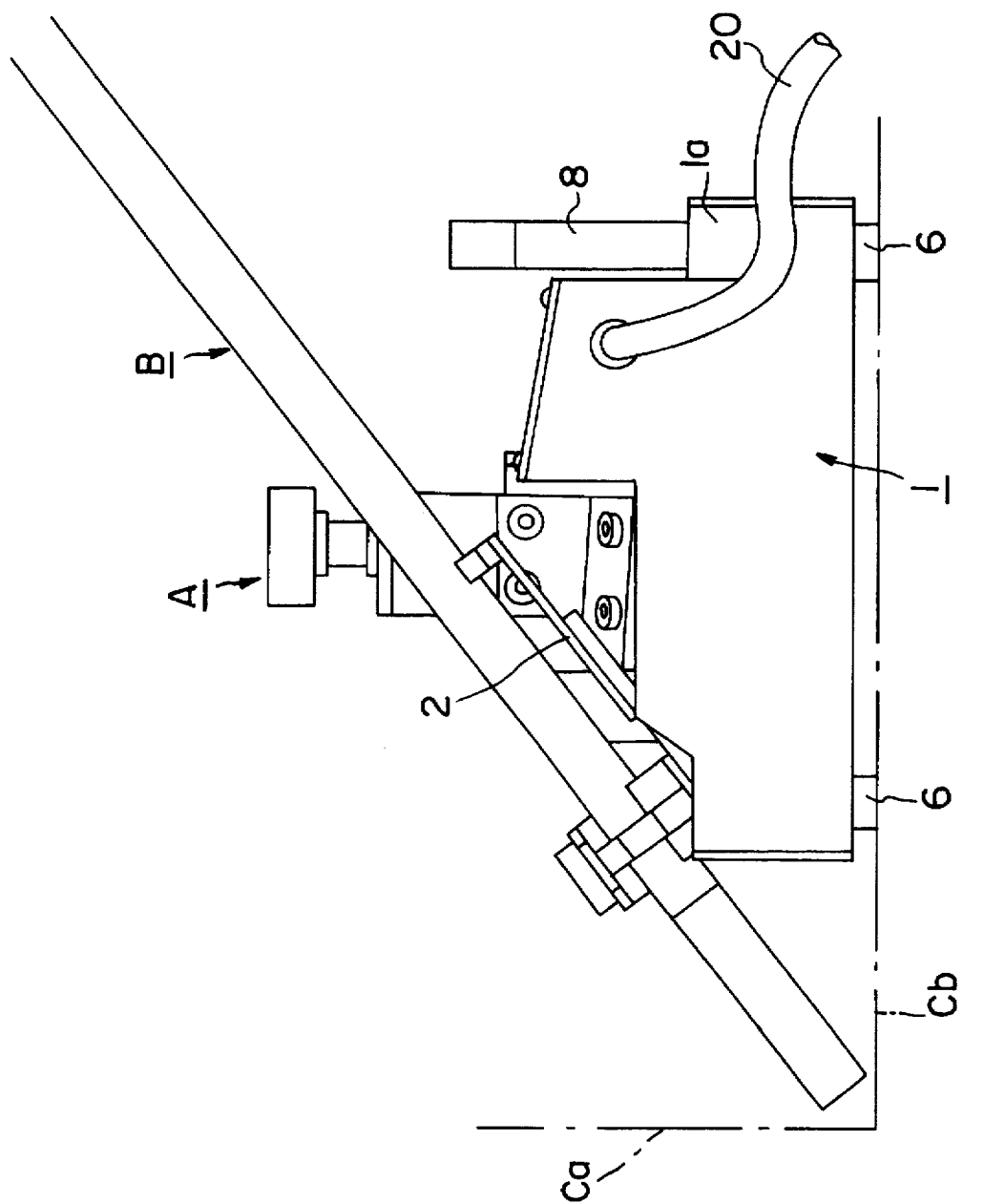
FIG. 1 is a front view showing a cart of a first embodiment of the invention.
Figure 3:
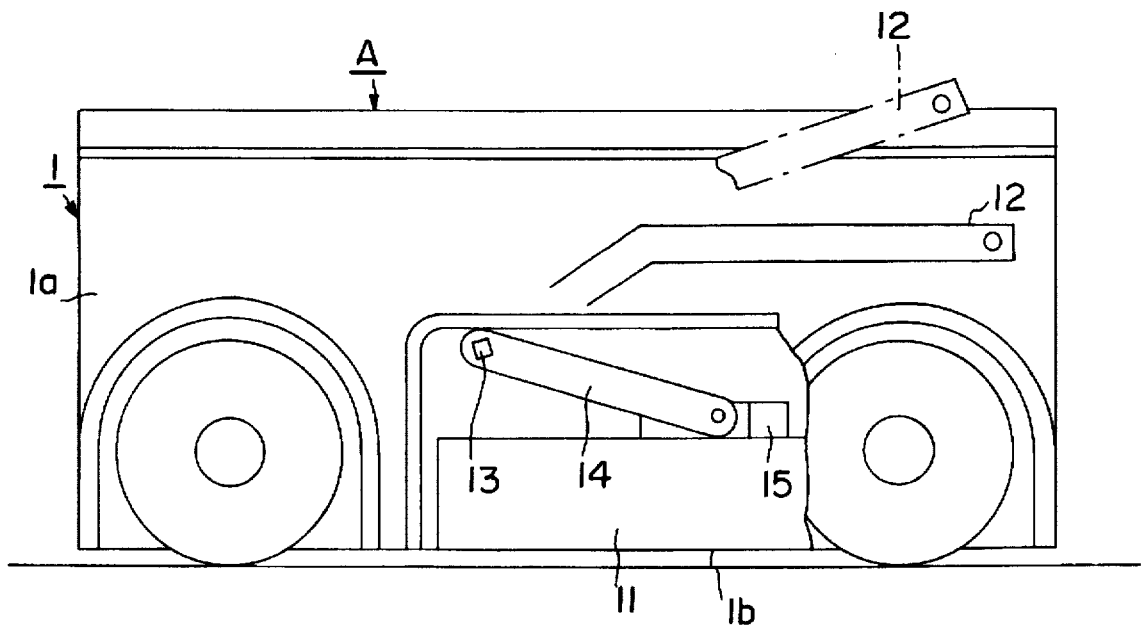
FIG. 3 is an illustration showing a condition when a magnet is brought closer to the bottom of the cart.
Figure 4:
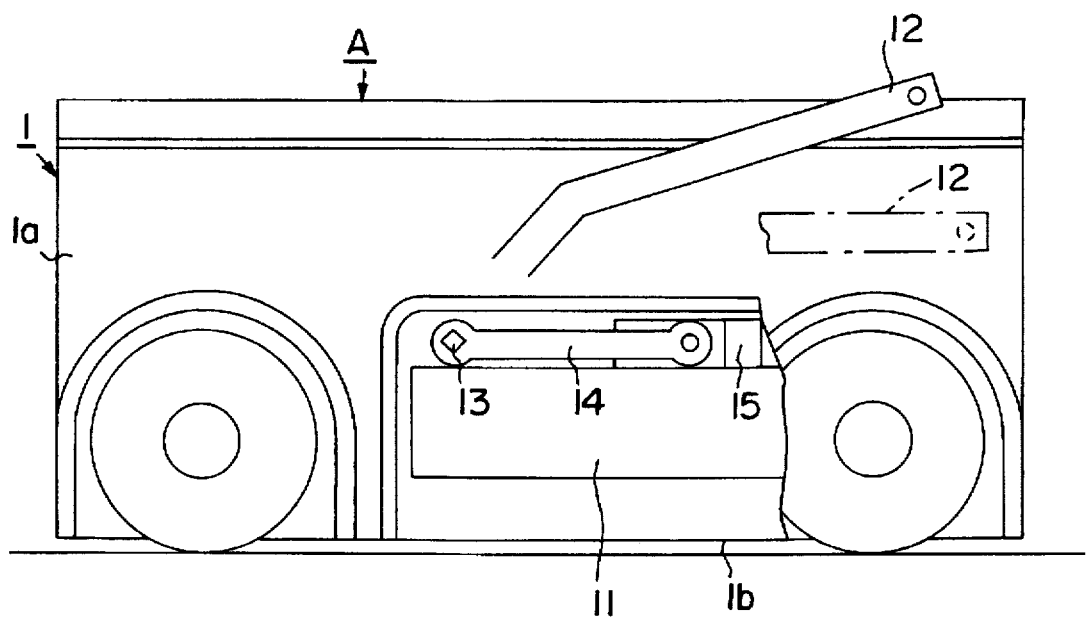
FIG. 4 is an illustration showing a condition when the magnet is isolated from the bottom of the cart.

Referring to FIGS. 1 to 4, a cart A according to a first embodiment of the invention is shown. The cart A mounts a welding torch B and is constituted as a welding cart for fillet welding materials Ca, Cb. The material Cb constitutes a track material at the same time. In FIG. 2, a cart body 1 of the cart A is made of an upper casing 1a and a bottom plate 1b. A holder 2 is formed at the top of the upper casing 1a to hold the welding torch B. The welding torch B is mounted on the cart A by attaching and securing the welding torch B to the holder 2.

Two motors 3a, 3b and two decelerators 4a, 4b are mounted inside the cart body 1. A set of the drive apparatuses is formed by one of the motors and one of the decelerators. That is, two sets of the drive apparatuses are mounted inside the cart body 1. The key feature of the invention is to drive independently left and right drive mechanisms of the cart with the two drive apparatuses.

On the left side of the cart A, the motor 3a is connected to a shaft 6a of a rear wheel through the decelerator 4a. Pulleys 7a, 7b are attached to the shafts 6a, 5a of the rear and front wheels 6, 5, respectively. The shaft of the front wheel 5a and the shaft of the rear wheel 6a operate in association with each other by connection to a timing belt 9a. The same linkage is formed on the right side. Wheels 10 are secured on the four shafts, respectively, and rubber is formed around the outer periphery of the wheels 10. The drive power produced at the motors 3a, 3b are transmitted to the rear wheel shafts 6a, 6b as well as front wheel shafts 5a, 5b through the timing belts 9a, 9b so that its rotational speed is reduced and its torque is made higher by the decelerators 4a, 4b. The four wheels 10 secured on the respective shafts rotate to drive the cart body 1. Since the surfaces of the wheels 10 are covered by the rubber, the cart has large friction to the welding material Cb, so that the cart can enjoy a larger pulling force.

A magnet 11 is disposed around the center inside the cart body 1 so as to be movable in a direction to come close to and away from the bottom plate 1b. This magnet 11 is made of a permanent magnet of ferrite magnetic steel. The bottom plate 1b is formed of a non-magnetic material such as aluminum or stainless steel. A lever 12 is disposed outside the cart body 1 to constitute transfer means for transferring the magnet 11. A shaft 13 is secure at the tip of the lever 12; a hinge 14 is secured on the shaft 13 at a position corresponding to an upper portion of the magnet 11. The hinge 14 engages a bracket 15 attached to the upper portion of the magnet 11, and according to the rotation of the hinge 14, the bracket 15 and the magnet 11 can come close to and away from the bottom plate 1b.

Accordingly, by rotating the lever 12 around the shaft 13 as a center, the magnet 11 can be positioned close to and away from the bottom plate 1b in accordance with the position of the lever 12. That is, when the lever 12 is manipulated to take the solid line position shown in FIG. 3, the magnet 11 comes close to the bottom plate 1b, and in this situation, an air gap between the magnet 11 and the welding material Cb becomes the minimum value. When the lever 12 is manipulated to take a position shown in FIG. 4, the magnet 11 is located away from the bottom plate 1b, thereby making the air gap the maximum.

Consequently, when the welding work is conducted where the cart body 1 mounts the torch B, the cart A can produce adequate pulling force and pull the hoses and electrical cords connected to the torch B. When the cart A is to be transported after the work ends, the cart body 1 can be separated from the welding material CB by a small amount of force upon moving the magnet 11 away from the bottom plate 1b by rotating the lever 12.

In this first embodiment, the motors 3a, 3b are DC motors and can change the speed between the low speed and high speed by changing the power supply voltage supplied thereto. The cart body 1 therefore can control its traveling direction by rotating the left and right motors 3a, 3b at different speeds. That is, when the cart A turns to the left, the right motor 3b is rotated with a high speed while the left motor 3a is rotated with a low speed. Similarly, when the cart A turns to the right, the left motor 3a is rotated with a high speed while the right motor is rotated with a low speed.

The speed control of the two motors 3a, 3b is remotely controlled by a control box 26 connected to the end of the cord 20. The control box 26 is formed with switches for starting, moving forward, stopping, moving backward, and steering of the cart. When an operator controls the control box in watching the movement of the cart A, a signal is sent to the controller (not shown) before inside the body through the cord 20. The controller that has received the signal at the time that the switches are manipulated, controls the speed of the respective motors by changing the voltage applied to the motors. By this control, the cart is able to control its traveling direction. The controller also manages turning on and off the welding torch, in addition to the control of the traveling direction.

Thus, the cart according to this embodiment has a function that the cart itself can modify the traveling direction, and therefore, the working line can be trailed by remote control of the operator, so that it is unnecessary to construct a rail or guide before welding work. In addition, the cart can travel on walls and steep slopes because the cart incorporates the magnet, so that the cart's constitution is particularly effective to let the cart work in those places in which construction of rails or guides is particularly difficult.

In a second embodiment, the motors 3a, 3b are pulse motors and drive according to frequency of pulse signals transmitted from the controller. Since the pulse motors determine their rotation number according to the frequency of the pulse signals, the left and right motors can rotate easily with the same rotation number, and surely and quickly respond when the frequency is changed.

Figure 5:
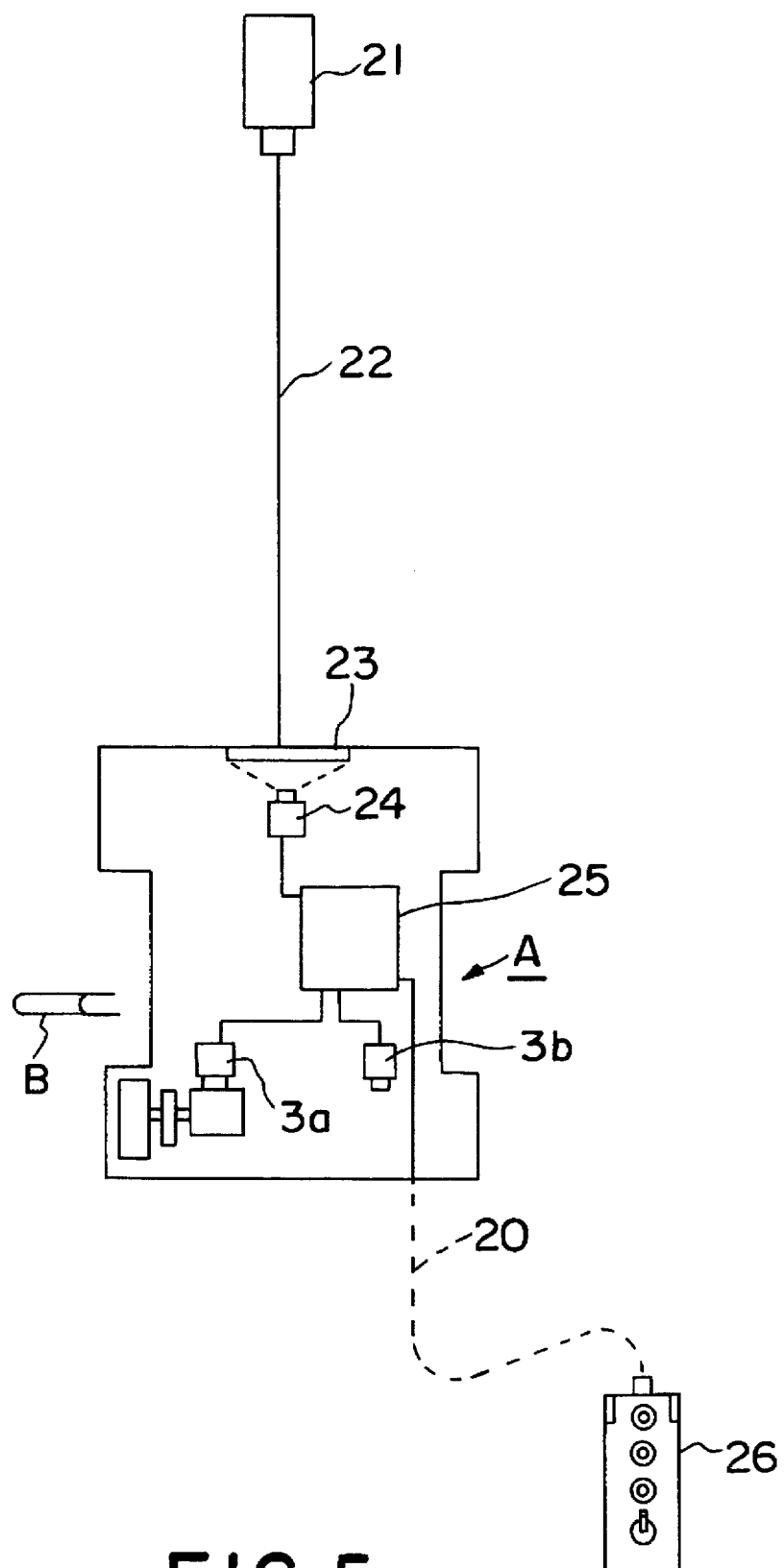
FIG. 5 is an illustration showing an automatic control system according to a second embodiment of the invention.

The cart according to this embodiment has an automatic control system for inducing straightness of the cart's forward movement using a laser beam's straightness as a traveling reference. Now, referring to FIG. 5, the automatic control system is described.

Prior to welding work, a laser oscillator 21 is set at the work end point, and then, laser beam is emitted from there in parallel to the working line. A screen 23 is set at a front of the cart body 1, and when the cart is brought at the work start point, the laser beam 22 reaches the screen 23 and produces a light point. Image information of the screen 23 on which the light point is formed is picked up by a CCD camera 24 attached inside the body as a sensor and is sent to the controller 25. The controller 25 includes a CPU, a RAM, a ROM, etc., analyzes the image information by a program stored in the ROM in advance, and detects the position of the light point on the screen 23.

Before start of traveling, the controller memorizes the position of the light point on the screen 23 as an initial value. If the position of the light point goes to the left or right beyond a prescribed permissible value after the cart starts traveling, the controller judges that the traveling direction is shifted and controls according to such a judgment. For example, if the light point is shifted to the right, the controller judges that the traveling direction is shifted to the left, and then, increases the frequency of the pulse signals to the left motor 3a, as well as reduces the frequency of the pulse signals to the right motor 3b. Under this control, the rotation number of the left motor 3a becomes higher than the right motor 3b, thereby turning the cart toward the right. If the light point moves to the left, the reversed control is done. The controller modifies the traveling direction in a manner as described when necessary until the end of the work.

A control box 26 is attached to the cart through cords 20 and allows the operator to control the cart while watching it. The control box 26 is built with switches for starting, moving forward, stopping, moving backward, and steering of the cart. The signals produced by the control box 26 is processed in taking priority in the automatic control by interrupting the CPU of the controller 25.

The cart according to the embodiment can control its traveling direction by detecting the traveling reference through the sensor arranged at the cart, and therefore, it is unnecessary to construct a rail or guide as in the prior art. The cart is controlled to move straight forward during working by the automatic control with the sensor, so that an operator can operate by manipulating plural carts at the same time.

It is to be noted that although the cart above is described as a cart for welding work having the welding torch B, the cart of the invention is not limited to the cart for welding work and can be a cart for cutting work by mounting a gas cutting torch or plasma cutting torch. Although in the embodiment above, the cart has four wheels and drives as four wheel drive, the cart, though having four wheels, can be driven as two wheel drive in which either front or rear wheels drive. In such a case, the driven wheels are desirably pivotable to a horizontal direction. One of the front or rear side can be a single wheel where the other of the front or rear side can be two wheels to form a three-wheeler. In this case, the driven wheels are desirably pivotable to a horizontal direction. In addition, the cart may be formed in a four-wheeler in a diamond shape in which wheels are provided at each center of four sides, in which horizontally pivotable driven wheels are provided at the front and rear side, and in which drive wheels are provided at the left and right side. Although the motor is controlled by a wired remote control in the control box, it can be a wireless remote control. Although it is exemplified, the method can be used that the laser beam is emitted from the front side along the working line and the cart trails the beam, as an example, using the sensor in the second embodiment. Other methods may be exemplified, as examples, using other sensors, in which the can proceeds using an arc sensor, or in keeping a distance from the guide using a contact or non-contact sensor while guides.

Although in FIG. 2 the motors 3a, 3b are arranged as to be juxtaposed with each other on the rear side of the cart body 1, the motors can be arranged in other forms such as juxtaposed with each other on the front side of the cart body 1 or in tandem. That is, the layout of the motors is thoughtfully determined in consideration to the occupied areas by the cart body, motors, magnet, etc. Although the motors 3a, 3b can switch their speed to either a high speed or a low speed, the motors may change their speed by means of multistage or continuously variable transmission in use of multiple stage or continuously variable resistor or the like. It is to be noted that the continuously variable transmission is suitable for automatic control using the sensors or the like because the continuously variable transmission may make the straight movement difficult when manually controlled. Although the DC motor and the pulse motor are used as a motor in the first and second embodiments, respectively, a motor for the invention is not limited to the above, and an AC motor can be used.

Although in the embodiment above, the transfer means for transferring the magnet 11 is constituted of the lever 12, the axis 13, and the hinge 14, any device can be used as long as it accomplishes the object that the magnet 11 is transferred to become close to and away form the bottom plate 1b. For example, where a spring is provided between the upper casing 1a and the bottom plate 1b, the spring can be compressed or extended to make the magnet 11 close to and away from the bottom plate 1b, as well as be released from being compressed or extended to make the magnet away from or close to the bottom plate 1b.

The cart according to the invention includes the two drive apparatuses and is constituted to transmit the drive power independently from the drive apparatuses to the left and right wheels. Accordingly, by driving the wheels on one side of the left and right wheels faster than the wheels on the other side, the cart can control its own traveling direction. The cart therefore no longer needs any rail or guide to regulate the traveling direction when manually controlled by the remote control.

The installment of the magnet inside the cart body enables the vertical opposing force to increase between the cart and the track material, thereby increasing friction between the wheels of the cart and the track material, and thereby increasing the pulling force without increasing the mass of cart. The cart, consequently, can travel on walls or steep slopes.

The magnet installed inside the cart body is movable in a direction so that the magnet is made close to and away from the track material, so that the attracting force of the magnet to the track material can be changed. As a result, when the cart is conveyed, the cart can be readily separated from the track material while the attracting force is being reduced.

When the cart is automatically controlled using the sensor, few number of operators are adequate to manipulate multiple number of the carts, so that work efficiency will be improved. Although some traveling reference is needed to be detected by the sensor, it is unnecessary to build a reference, to regulate the traveling direction, to which the cart needs to be in contact and to apply a load, likewise conventional traveling reference such as rails or guides. That is, the strength is not required for the traveling reference, and such a traveling reference can be simplified to the extent of material, shape, attaching method, and the like.

In sum, to operate the cart, it is unnecessary to build in advance any rail or guide otherwise a simple one is suffice. When used for welding or cutting work, the cart can increase the attracting force to pull hoses and cords adequately; when conveyed, the cart can reduce the attracting force to be readily separated from the track material. Accordingly, it is effective when the cart is used to travel particularly on walls or steep slopes on which rails or guides are difficult to be built.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not to be limited by the specification, but be defined by the claims set forth below.

What is claimed is:

1. A cart travelling on processed material having a welding torch or cutting torch comprising:

a cart body;

left and right wheels; and two drive apparatuses mounted on the cart body, wherein said drive apparatuses transmit their powers to the left and right wheels respectively in order to drive said left and right wheels independently.

2. The cart according to claim 1, wherein the left and right wheels are four wheels provided two on each side, and a front wheel and a rear wheel on each side are linked by drive power transmitting means to transmit the drive power.

3. The cart according to claim 1, wherein the cart body includes a magnet inside thereof in order to push the wheels to the processed material side and give gripping power to the wheels.

4. The cart according to claim 3, wherein the magnet is movable in a direction to make the magnet come close to and away from the processed material in order to increase and decrease the gripping power to the wheels.

5. The cart according to claim 1, further comprising a sensor to detect a traveling reference, wherein the output of the two drive apparatuses can be controlled in accordance with signals from the sensor.

6. A cart travelling on processed material having a welding torch or cutting torch thereon comprising:

a cart body having mounted therein a magnet;

right and left wheels; and two drive apparatuses mounted on said cart body, said drive apparatuses transmit power to said right and left wheels respectively in order to drive said right and left wheels independently of one another, and said magnet being capable of attracting the processed material upon which the wheels of said cart travel, said magnet being movable in a direction toward or away from the processed material in order to increase or decrease gripping of said wheels to said processed material.

7. The cart according to claim 6, further comprising a sensor to detect a traveling reference, wherein the output of the two drive apparatuses can be controlled in accordance with signals from the sensor.

8. The cart according to claim 6, further comprising a controller for controlling the direction of travel of the cart, and a sensor and screen for detecting a laser beam, said controller controlling said drive apparatuses in response to signals received from said sensor, and being connected to said screen via said sensor.

* * * * *